US006756141B2

(12) United States Patent
Miller et al.

(10) Patent No.: US 6,756,141 B2
(45) Date of Patent: Jun. 29, 2004

(54) THREE-ELECTRODE FUEL CELL

(75) Inventors: Michael A. Miller, San Antonio, TX (US); Craig M. Wall, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 236 days.

(21) Appl. No.: 10/028,710

(22) Filed: Dec. 28, 2001

(65) Prior Publication Data

US 2003/0022032 A1 Jan. 30, 2003

Related U.S. Application Data

(60) Provisional application No. 60/283,923, filed on Apr. 17, 2001.

(51) Int. Cl.[7] .......................... H01M 8/04; H01M 6/00; C25B 15/00; C25B 1/00

(52) U.S. Cl. ...................... 429/22; 29/623.5; 204/230.1; 205/343

(58) Field of Search ............................. 429/12, 13, 22; 204/194, 230.1; 205/343; 29/623.5

(56) References Cited

U.S. PATENT DOCUMENTS 4,127,462 A * 11/1978 Blurton et al. ............... 204/412

FOREIGN PATENT DOCUMENTS

JP          07-022047      *  1/1995

OTHER PUBLICATIONS

"Transfer Matrix Method for the Electrochemical Impedance of Inhomogeneous Porous Electrodes and Membranes," P.H. Nguyen, G. Paasch; Journal of Electroanalytical Chemistry, vol. 460; pp. 63–79; (1999).
"Osseous Implant for Studies of Biomaterials Using an in vivo Electrochemical Transducer," W. Casey Fox, Michael A. Miller; Journal of Biomedical Materials Research, vol. 27, pp. 763–773; (1993).
"Dispersion and Absorption in Dielectrics," Kenneth S. Cole, Robert H. Cole; Journal of Chemical Physics, vol. 9, pp. 341–351 (Apr. 1941).
"The Platinum Microelectrode/Nafion Interface: An Electrochemical Impedance Spectroscopic Analysis of Oxygen Reduction Kinetics and Nafion Characteristics," Arvind Parthasarathy et al.; J. Electrochem. Soc., vol. 139, No. 6, pp. 1634–1641; (Jun. 1992).
"On Porous Electrodes in Electrolyte Solutions," R. DeLevie; Electrochimica Acta, vol. 8, pp. 751–781; (1963).
"Impedance Spectroscopy: Emphasizing Solid Material and Systems," J. Ross Macdonald; pp. 173–190; (1987).

* cited by examiner

Primary Examiner—Patrick Ryan
Assistant Examiner—Thomas H. Parsons
(74) Attorney, Agent, or Firm—Oliff & Berridge, PLC (57) ABSTRACT

A fuel cell includes an anode electrode, a cathode electrode, and a third electrode interposed between the anode and the cathode electrodes. The third electrode preferably includes an electrically conductive component. The third electrode preferably includes a metallic and a polymer grid and/or a conducting polymer. The third electrode may be used to control processes of the anode and/or the cathode electrodes. The third electrode may also be used to monitor the health of any component of the fuel cell.

25 Claims, 7 Drawing Sheets

Anodic Reaction

Adsorption

Charge Transfer & Surface Dissociation

Diffusion

Cathodic Reaction

Adsorption

Charge Transfer & Surface Dissociation

Diffusion

THREE-ELECTRODE FUEL CELL

This application claims benefit of 60/283,923 filed Apr. 17, 2001.

BACKGROUND OF THE INVENTION

Field of Invention

The present invention relates to a novel design and utility of fuel cells wherein a third electrode is interposed between the anode- and cathode electrodes of a conventional sandwich arrangement. The third electrode is in the present invention conductive to chemical species of the electrochemical couple and, therefore, permits their transport through the electrode material. It is also electrically conductive to electrons, thus allowing electrical current to flow as in a conventional solid metal electrode. However, when the third electrode is interposed between the anode and cathode of the fuel cell couple, as in a sandwich stack arrangement, its function is insulated from direct electrical contact with either the anode or cathode of the fuel cell couple by virtue of being embedded within the electrolyte. In that capacity and in conjunction with a voltage source, the third electrode functions as a reference or control electrode to regulate, manage, or monitor electrochemical processes at the anode or cathode.

SUMMARY OF THE INVENTION

The present invention teaches a novel concept in fuel cell design, operation, and utility that embodies an interposed third electrode between the anode and cathode of a conventional sandwich configuration. The third electrode is in the present invention conductive to chemical species of the electrochemical couple and, therefore, permits their transport through the electrode material. It is also electrically conductive to electrons, thus allowing electrical current to flow as in a conventional solid metal electrode. However, when the third electrode is interposed between the anode and cathode of the fuel cell couple, as in a sandwich stack arrangement, its function is insulated from direct electrical contact with either the anode or cathode of the fuel cell couple by virtue of being embedded within the electrolyte. In that capacity and in conjunction with a voltage or current source or an electrical measurement apparatus, the third electrode functions as a reference or control electrode to regulate, manage, or monitor electrochemical processes at the anode or cathode.

These and other objects, advantages and salient features of the invention are described in or are apparent from the following description of exemplary embodiments.

BRIEF DESCRIPTION OF THE DRAWINGS

A more complete understanding of the method and apparatus of the present invention may be obtained by reference to the following Detailed Description when taken in conjunction with the accompanying Drawings wherein.

TABLE 1 are experimental parameters used to measure the electrochemical impedance behavior of one example of the embodiment, the table of parameters applies to a three-electrode PEMFC; and TABLE 2 indicates results of model parameter fits as a function of the applied polarization potential at the cathode of a three-electrode PEMFC.

DETAILED DESCRIPTION OF PREFERRED EMBODIMENTS

Alternative technological venues to present-day fuel cell designs and materials that lead to significant improvements in their operational efficiency and utility are needed before broad commercial applications, such as stationary and automotive power generation, become economically viable. The principal incentive for the continued interest in fuel cell development is that fuel cells of an optimum design have the potential to be much more efficient than conventional thermal sources. While present-day fuel cells have evolved technologically to a state of development that commercial applications have merited from significant investment among the civil and transportation community, there are many gains yet to be made to achieve the operational goals demanded of these applications in terms of efficiency, weight, and cost.

In the context of efficiency gains, present-day fuel-cell designs are microscopically complex electrochemical systems if one considers the diversity of materials and interfacial structures that play a collective role in completing the electrochemical couple. For example, one embodiment of the present invention, the polymer electrolyte membrane fuel cell (PEMFC), typically includes at least four different material structures (i.e., polymeric membrane, a noble metal catalyst, a cellulosic gas diffusion structure, and metallic collector plates) all of which must be combined intimately with each other and, thus, constitute a complex network of heterogeneous interfaces. This microscopic complexity contributes to the power or performance limitations of the cell because the electrochemical processes that must occur at the anode and cathode, the exchange currents, are limited by the rate of charge transfer and by the diffusion of chemical species across interfacial barriers. Furthermore, these phenomena account for only the inherent efficiency limitations of the cell design under ideal conditions and do not take into consideration how the cell efficiency is affected by, for example, the purity of chemical species to be oxidized and reduced.

Since a conventional two electrode fuel cell operates much like a galvanic electrochemical cell, with the exception that the chemical species to be oxidized and reduced are supplied externally to the system, its power performance is dictated principally by the working electromotive force (e.m.f.) and, as current is demanded of the cell, by the Butler-Volmer equation shown in (1).

$$j_{cell} = j_{eq}[e^{-\alpha \Delta \phi F/RT} - e^{(1-\alpha)\Delta \phi F/RT}] \quad (1)$$

This expression relates the net current density (j) produced by the cell to its over potential ($\Delta\phi$) at some temperature (T), where the pre-exponential factor ($j_{eq}$) is the exchange current density when the cell is at equilibrium; that is, when the cell is at rest and the net current is zero. The exchange current density contains the kinetic and thermodynamic terms of the relationship that consider the Gibbs free-energy functions of the oxidation and reduction reaction, which occur conventionally at the anode and cathode of the cell, respectively.

In a galvanic two electrode system, the working e.m.f. of the cell ($\Delta\phi_{cell}$) is reduced from its equilibrium value ($\Delta\phi_{eq}$) as current is demanded because the cell is no longer at equilibrium reversible conditions. This reduction in cell e.m.f. can be related to Equation 1 under various assumptions by the following approximation:

$$\Delta\phi_{cell} = \Delta\phi_{eq} - j_{cell}AR_x - \quad (2)$$
$$(2RT/zF)\ln\left\{\frac{\left(j_{cell}/\sqrt{j_{eq}j_{eq}^{-1}}\right)^{2x}}{[(1-j_{cell}/j_{lim})(1-j_{cell}/j_{lim}^{-1})]^{1/2}}\right\}$$

The second term of Equation 2 takes into account the uncompensated resistance of the cell imposed by the collective resistance of the electrolyte and material interfaces between the two electrodes of equivalent area A, while the third term is a combination of the Butler-Volmer expression (Equation 1) and the effects of Nernstian diffusion as concentration gradients arise at each electrode. The limiting current densities ($j_{lim}$ and $j'_{lim}$) at each electrode are a consequence of the respective concentration gradients and, notably, the cell potential approaches a singularity at the limiting current density.

What is of interest in an electrochemical source, however, is the generation of power (P), which is Equation 2 multiplied by the current demand of the system. It can be concluded without further derivation that the power performance of a conventional, galvanic two-electrode fuel cell is also dictated by the reduction in e.m.f., as approximated by Equation 2, at a particular current demand (I).

Conversely to the principles of a two-electrode galvanic system, in a potentiostatic system, the cell e.m.f. is regulated at a desired level and polarity by the application of an external potential (i.e., an overpotential) to either the anode or cathode of the cell. In a three-electrode potentiostatic system the external potential is applied to either the anode or cathode of the cell relative to a reference third electrode. Therefore, a three-electrode potentiostatic system by design permits control of the e.m.f. of an electrochemical cell and, thereby, provides a means of controlling the electrochemical processes at the anode or cathode that regulate the generation of power from the cell.

Figure 3:
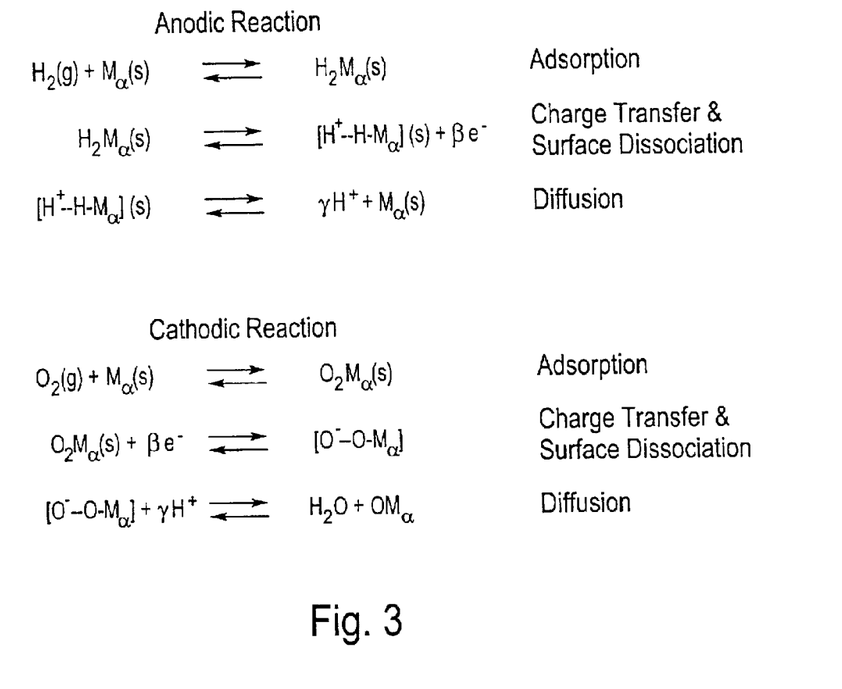
FIG. 3 are mechanistic pathways and transition state intermediates that play a role at the cathode and anode of the hydrogen/oxygen fuel cell, where metal catalyst is represented by the symbol $M_{ct}$.

The overall cathodic and anodic electrochemical reactions of the hydrogen | oxygen fuel cell, of which the PEMFC is one example, can be generalized by step-wise sequence of critical processes as shown in FIG. 3. In the present example of one embodiment of the invention, a deeper understanding of the kinetic and transport processes that occur within the interfaces of PEMFC materials were examined independently for each half-cell reaction using dc voltammetric and ac impedance techniques, also known as electrochemical impedance spectroscopy (EIS). One difference between the concept of the present work and what has been reported in the literature heretofore is that the three-electrode experimental configuration of the present invention provides a means of probing the electrochemistry of any one of the two half-cell reactions as hydrogen and oxygen gases are presented to the anode and cathode, respectively.

The principal focus of one example of the electrochemical measurements as taught in the present invention was on the insight that ac impedance measurements could shed on heterogeneous interfacial processes of the PEMFC. In the present case, the mechanistic relationship between the diminishment and recovery of fuel cell power and localized interfacial processes were determined by measuring changes in the frequency-dependent relaxations of each process via an impedance metric. Each step of the sequence shown in FIG. 3 is associated with a unique relaxational time-constant relative to the total impedance response of the half-cell reaction. Because ac impedance measurements are conducted over a spectrum of perturbations, the relaxational constants for individual processes in most instances can be delineated from the overall impedance response of the system. The numerical algorithms used to deconvolve frequency-dependent impedance spectra have been worked-out in some detail for a number of systems (as described, for example, by W. C. Fox and M. A. Miller in *J. Biomed. Mat. Res.* (1993), p. 27, and by R. J. Macdonald and W. B. Johnson in *Impedance Spectroscopy: Emphasizing Solid Materials and Systems*, ed. J. Ross Macdonald, USA; John Wiley & Sons, Inc., 1987), including the electrochemical characterization of fuel cell reactions (as described, for example, by A. Pathasarathy et al. in *Electrochem. Soc.* (1992), 139(6), pp. 1634–1641). These models and numerical techniques were further refined and applied to the concepts of the present invention.

Model Development

A mathematical model to describe the electrochemical response of a three-electrode PEMFC is founded on an ideal geometric representation of the porous, ionomer membrane, because the membrane and its catalytic or conductive substrate are what play a central role in the performance of fuel cells of this type. In the present example of the embodiment, a sandwich assembly including the membrane, catalyst, and electrode material forms a membrane electrode assembly (MEA), which will be used henceforth to generalize the theme and utility of the present invention.

The tortuosity and high surface-area of the MEA manifests in a complex network of interfaces that ultimately control the limits of mass- and charge transfer. At a microscopic level, a rigorous treatment of the actual geometric variability of the membrane-substrate interfaces, and the effect that this variability has on electrochemical transport, becomes mathematically intractable. Therefore, the model is simplified by introducing physical constraints.

Physical and Geometric Constraints of Model

In the present model, we fix the pore geometry of the membrane so that the membrane is a homogenous structure, which reduces the physical construct to a one-dimensional, axisymmetric problem, similar in principle to that used by de Levie and others (as described, for example, by R. De Levi in *Electrochem. Acta* (1963), 8, 751 and by P. H. Nguyen in *Electroanalytical Chem.* (1999), 460, 63–79.) At this juncture, it is important to mention that the three-electrode fuel-cell arrangement provides an opportunity to experimentally validate the limits of this phenomenological model in situ without having to exclude the complementary half-cell reaction from the measurement. The geometric representation of a single-pore model to be applied under the present circumstance is shown in FIG. 4.

Figure 4:
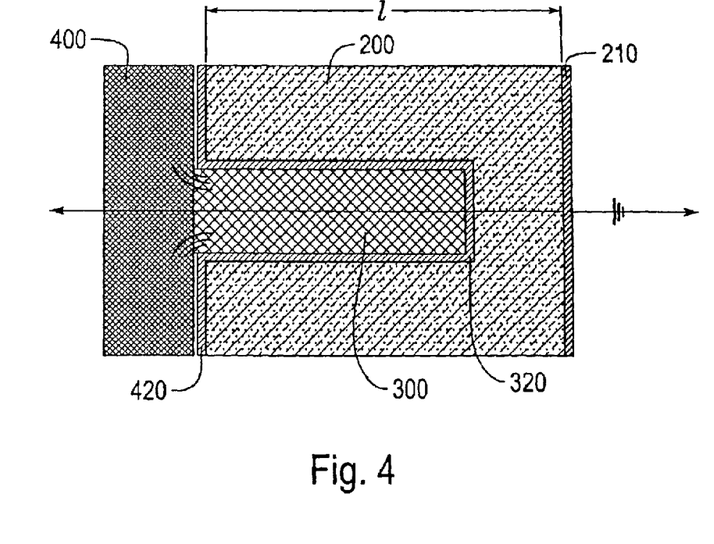
FIG. 4 is a geometric model of a single-pore structure relevant to the porous, conductive film electrode of one example of the embodiment, where an example is shown for the third electrode of a three-electrode PEMFC.

The geometric model of the single pore structure shown in FIG. 4 includes a conductive substrate 200, a pore electrolyte 300 and a bulk electrolyte 400. Based upon this geometric model, we define a porous layer of arbitrary thickness 1, comprising pores of critical length $1_p \ll 1$ that penetrate a planar current collector of cross-sectional area A. These dimensional constraints are assumed constant for all pores in the porous layer structure. Three interfacial regions exist among the geometric components of a single pore, generically defined as: (1) the bulk-electrolyte/substrate interface 420; (2) the pore-electrolyte/substrate interface 320; and (3) the substrate/bulk-conductor interface 210. The integrated impedance corresponding to each electrochemical interface is given by the complex functions $Z_o$, $Z_q$, and $Z_n$, respectively, which depend on frequency ($2\pi/t$). The uncompensated impedance of the conductive substrate 200, the pore electrolyte 300 and the bulk electrolyte 400 are represented by $Z_s$, $Z_p$ and $Z_n$, respectively.

Figure 5:
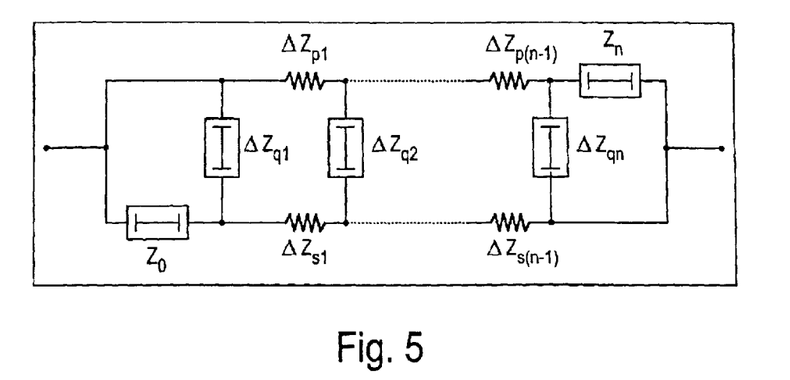
FIG. 5 is an axisymmetric model in differential form representing the discrete components of the pore structure of FIG. 3.

The geometric representation of a single-pore model shown in FIG. 4 can be reduced to an axisymmetric equivalent impedance model as shown in FIG. 5. In FIG. 5, $\Delta Z_{p1}$, $\Delta Z_{p2}$, ... $\Delta Z_{p(n-1)}$ present analytically descritized values of Zp; $\Delta Z_{q1}$, $\Delta Z_{q2}$, ... $\Delta Z_{qn}$ represent analytically descritized values of $Z_q$; and $\Delta Z_{s1}$, $\Delta Z_{s2}$, ... $\Delta Z_{s(n-1)}$ represent analytically descritized values of $Z_n$.

Reduction of Model to Differential Form

The integrated impedance along the pore and substrate ($Z_p$ and $Z_s$), respectively, are descritized by a length dx, and equated to the specific resistivity ($\rho j$), as the coupled differential equations, $$\frac{dZ_j}{dx} = \frac{\rho_j}{A} \qquad (3)$$

$$j = p, s$$

where the subscripts p and s denote the pore and substrate regions, respectively. The impedance $Z_q$ at the interfacial region between the pore electrolyte and substrate also is descritized by an infinitesimal length dx, which can be equated to the specific conductivity g as given in Equation 2.

$$\frac{dZ_q}{dx} = (g \cdot A)^{-1} \qquad (4)$$

Now, given a current I and zero reference potential (i.e., ground), Equation 1 can be expressed in terms of the potential differences $V_j$ (i.e., measured voltage) along each component of the pore structure, which are position- and time dependent, as the coupled differential equations $$\frac{dz_j}{dx} = -\left(\frac{1}{I}\right)\frac{dV_j}{dx} = \frac{\rho_j}{A} \qquad (5)$$

$$V_j = \varphi_j(x, t) - 0$$

From Equations 3–5, the relationship between the differential potential along each component of the pore structure and the differential potential at the interface between each component is derived in Equations 6 and 7, which follows:

$$\frac{g}{l}(\varphi_s - \varphi_p) = -\frac{1}{\rho_s}\frac{d\varphi_s(x, t)}{dx} \qquad (6)$$

$$\frac{g}{l}(\varphi_s - \varphi_p) = \frac{1}{\rho_p}\frac{d\varphi_p(x, t)}{dx} \qquad (7)$$

Equations 6 and 7 relate the integrated potential differences at the interfacial region between the pore and substrate components of the pore structure from the integrated interfacial impedance $Z_q$. In differential form, this interfacial region is descritized again by the infinitesimal length dx, which necessitates differentiating both sides of each equation (6 and 7). After substituting the appropriate differential form of each equation, the relevant coupled, second-order differential equations in terms of the position- and time dependent potentials are given as follows (Equations 8 and 9).

$$\frac{g}{l}(\varphi_s(x, t) - \varphi_p(x, t)) = -\frac{d}{dx}\left(\frac{1}{\rho_s}\frac{d\varphi_s(x, t)}{dx}\right) \qquad (8)$$

$$\frac{g}{l}(\varphi_s(x, t) - \varphi_p(x, t)) = -\frac{d}{dx}\left(\frac{1}{\rho_p}\frac{d\varphi_p(x, t)}{dx}\right) \qquad (9)$$

Boundary Conditions

There are in the present pore model two forms of conductivity, electrical conductivity at the substrate and current collector, and ionic conductivity at bulk electrolyte and pore electrolyte. Therefore, the boundary conditions for the differential potentials are realized by electric current vanishing in the region of the substrate at the interface between the bulk electrolyte and the porous layer, and ionic current vanishing in the region of the pore at the interface between the pore electrolyte and the substrate. An ohmic current density j exists everywhere else. These boundary conditions can be expressed analytically as follows:

$$\left(\frac{\partial \varphi_s}{\partial x}\right)_{x=0} = 0 \qquad \left(\frac{\partial \varphi_s}{\partial x}\right)_{x=1} = -\rho_s j \qquad (10)$$

$$\left(\frac{\partial \varphi_p}{\partial x}\right)_{x=0} = \rho_p j \qquad \left(\frac{\partial \varphi_p}{\partial x}\right)_{x=1} = 0$$

Derivation of Measured Impedance

We now return to a derivation of the measured complex impedance for the model system. By imposing a sinusoidal (AC) perturbation in current $$I = Aj \exp(i\omega t) \qquad (11)$$

the complex impedance, which depends on the radial frequency co, is expressed generically as $$Z(i\omega) = \frac{V(\omega)}{A j \exp(i\omega t)} \quad (12)$$

$$V(\omega) = \varphi_p(0, \omega) - \varphi_s(l, \omega)$$

After solving the coupled differential equations 8 and 9 (details omitted), and substituting the solution into Equation 12, one can obtain an expression for the complex impedance of the pore structure, which follows:

$$Z_{pore} = \frac{l}{A}\left[\frac{\rho_s^2 + \rho_p^2}{\rho_s + \rho_p}\cdot\left(\frac{\lambda}{l}\right)\cdot\coth\left(\frac{l}{\lambda}\right) + \frac{2\rho_s\rho_p}{\rho_s + \rho_p}\left(\sinh\left(\frac{l}{\lambda}\right)\right)^{-1} + \frac{\rho_s\rho_p}{\rho_s + \rho_p}\right] \quad (13)$$

The complex, frequency-dependent decay length $\lambda$ found in Equation 12 is given by:

$$\lambda = \frac{1}{\sqrt{g(\rho_s + \rho_p)}} \quad (14)$$

where the complex conductance g is related to the admittance Y, the capacity per unit area C, the effective pore area per unit volume $A_p$, and the characteristic frequency $\omega_o$ as $$g = CA_P(\omega_0 Y + i\omega) \quad (15)$$

Equations 13–15 describe completely, albeit idealistically, the frequency-dependent impedance of a homogeneous, porous membrane structure at the interface between the bulk electrolyte and a conductive collector in terms of a set of physical, macroscopic parameters. The effective pore impedance can be simplified further by considering the case where the substrate material is composed of a noble metal, such as platinum, palladium or ruthenium. In this case, the specific resistance $\rho s$ (Pt, $9.85\mu\Omega\cdot$cm) is small compared with that of the pore $\rho_p$ ($\approx 10$ $\Omega$), a factor of $10^{-7}$, and the pore impedance consequently reduces to $$Z_{pore} = \frac{\rho_p \lambda}{A}\cdot\coth\left(\frac{l}{\lambda}\right) \quad (16)$$

Parametric Model of Three-Electrode Fuel Cell

The frequency-dependent impedance of the pore structure mapped by Equation 13 is but one discrete component of the total impedance behavior measured across the three-electrode fuel cell. In addition to the energy dissipation experienced by ion and electron transport within the pore structure of the MEA, one must consider also processes of the electrochemical couple in order to arrive at a complete model. Again, these processes, both charge- and mass transfer, can be partitioned mechanistically into the pathways outlined in FIG. 3. From a purely electrochemical viewpoint, the effect that a porous structure has on the electrochemical impedance of the interface is governed principally by different site-specific accessibilities or different reaction probabilities of the transport and electron transfer processes that partake as a consequence of the electrochemical driving force (i.e., dc bias potential applied across the interface). The connectivity and tortuosity of the interface that exists across the MEA in essence impacts the nascent reactivity of the system (cathodic and anodic reactions under catalytic control), both the electron transfer and diffusion processes, which can be probed by electrochemical impedance spectroscopy (EIS).

In the special case of a simple electrochemical or dielectric interface having a single relaxation process (time constant $\tau$), the impedance may behave in accordance with the single impedance arc of the Cole—Cole distribution model as given in Equation 17. In this model, the subscripts $\infty$, and 0 are used to denote the high- and low frequency limits of the impedance, respectively, and the parameter $\beta$, takes into consideration non-ideal behavior of the system, whereby individual processes are governed by a distribution of relaxation times or a distribution of activation energies (as described, for example, by K. S. Cole in *Chem. Phys.* (1941),9, 341–351).

$$Z(i\omega) = Z_\infty + \frac{Z_0 - Z_\infty}{1 + (i\omega\tau)^\beta} \quad (17)$$

Figure 6:
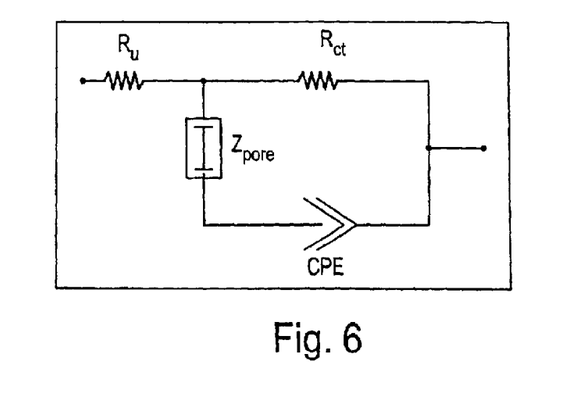
FIG. 6 is an equivalent circuit block arrangement used to characterize one example of the embodiment, where the model applies to a three-electrode PEMFC.

Therefore, the parametric form of a model that describes the impedance behavior of the three-electrode MEA is obtained by combining the Cole—Cole distribution model of Equation 17 with the porous membrane model derived in the previous section (Equation 16). We simplify further the parameters of interest by noting that the difference between the impedance at the high- and low frequency limits of Equation 17 is defined as the charge transfer resistance $R_{ct}$ for either the cathodic or anodic reactions, and $Z_\infty$ is the dc, uncompensated resistance ($R_u$) of the MEA. The combination of these parametric quantities is represented in FIG. 6 as the electrochemical equivalent circuit model, wherein the pore specific resistance $\rho_p$ (Equation 13 and 16), the charge transfer resistance $R_{ct}$ (Equation 17), the relaxation time constant $\tau$ (as the product $R_{ct}$ x cell capacitance), and the distribution exponent $\beta$ constitute the fitting parameters for treatment by non-linear regression analysis. The Marquardt-Levenberg algorithm was used to determine the parameter values that minimize the sum of squares of differences between the dependent real and imaginary values in the model and the measured values. It should be noted that $Z_{pore}$ of FIG. 6 corresponds to the uncompensated impedance $Z_p$ of the pore electrolyte 300 of FIG. 4. Additionally, "CPE" in FIG. 6 represents a Constant Phase Element.

Experimental Measurements

EIS measurements of the three-electrode MEA fuel-cell were conducted in situ using the three electrode experimental set-up described previously. In the experimental measurements disclosed here, the working electrode was designated as the cathode (oxygen reduction), while the anode (hydrogen oxidation) of the fuel cell was assigned to the counter electrode of the circuit. The interposed third electrode (a distinct platinized membrane separate from the polymer electrolyte membrane), which was sandwiched between the anode and cathode of the MEA, was used as a reference electrode. Under this configuration, the metallic coating on the interposed membrane electrode, which was deposited on one side of a separate ionomer membrane, was in direct contact with the polymer electrolyte membrane and faced the working electrode (cathode) of the fuel cell.

Figure 7A:
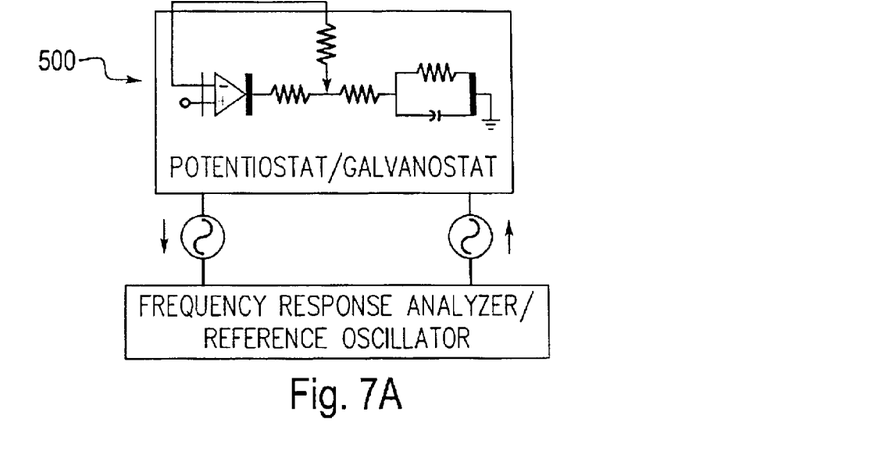
FIG. 7A is an experimental apparatus and circuit block arrangement used to characterize one example of the embodiment.
Figure 7B:
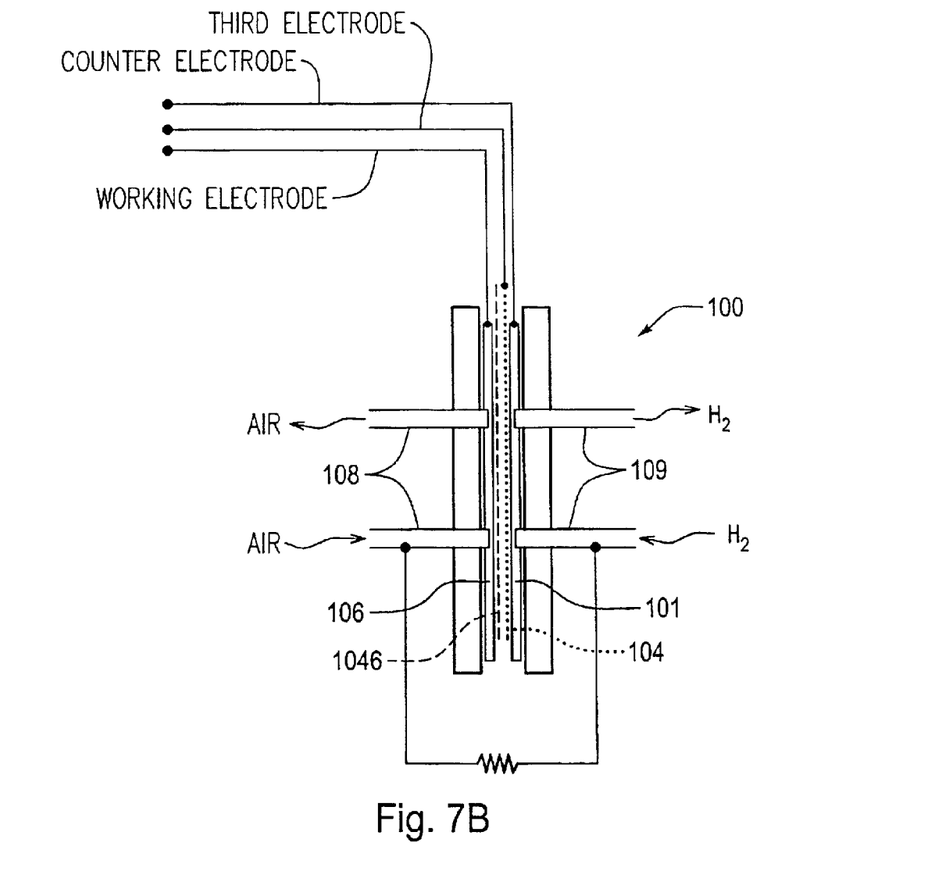
FIG. 7B shows a three-electrode PEMFC to which the experimental arrangement of FIG. 7A applies.
Figure 8:
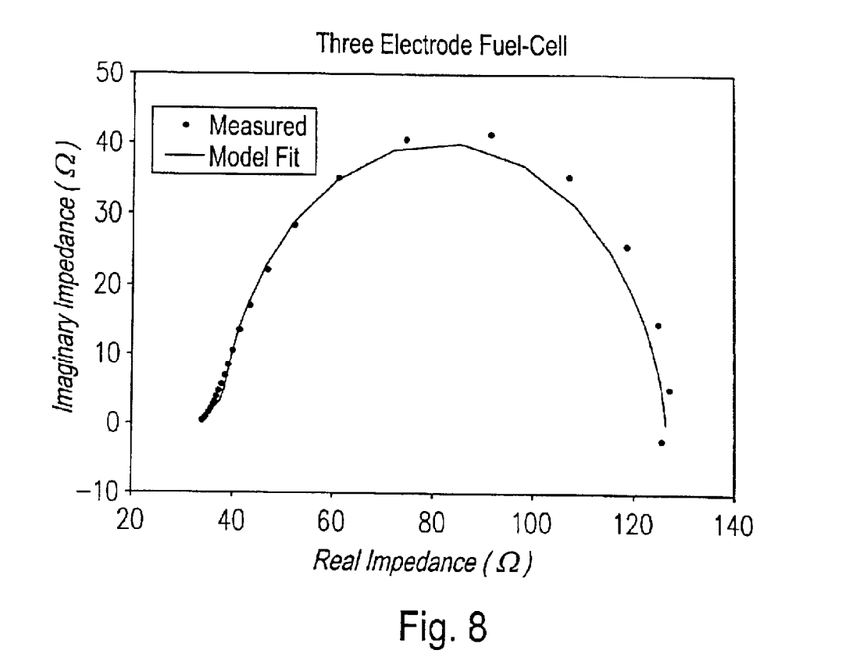
FIG. 8 is a comparison between the measured complex impedance and modeled fit of the three-electrode PEMFC at a polarization potential of 0.448V vs. Pt-membrane interposed reference electrode.
Figure 9:
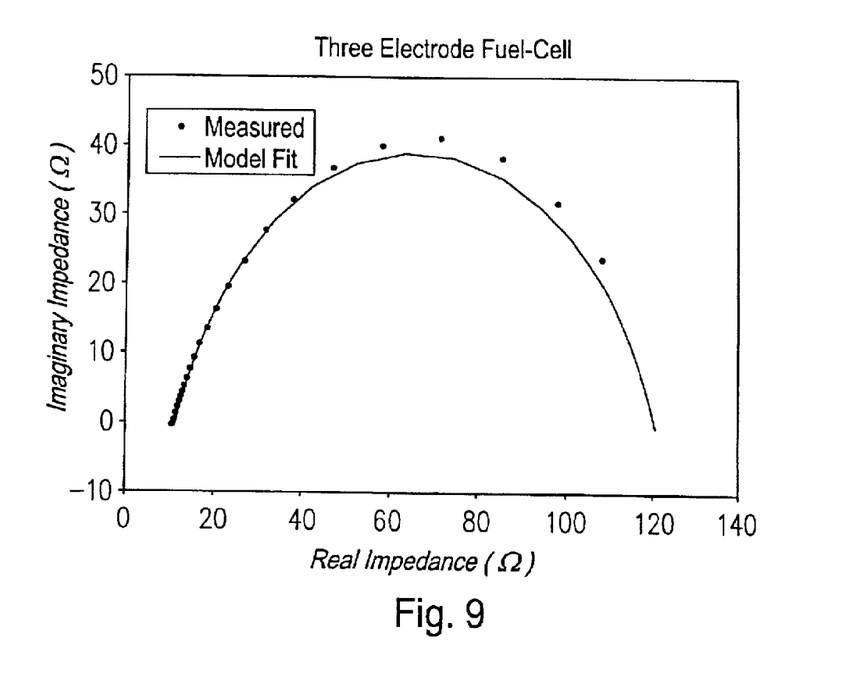
FIG. 9 is a comparison between the measured complex impedance and modeled fit of the three-electrode PEMFC at a polarization potential of 0.708V vs. Pt-membrane interposed reference electrode.
Figure 10:
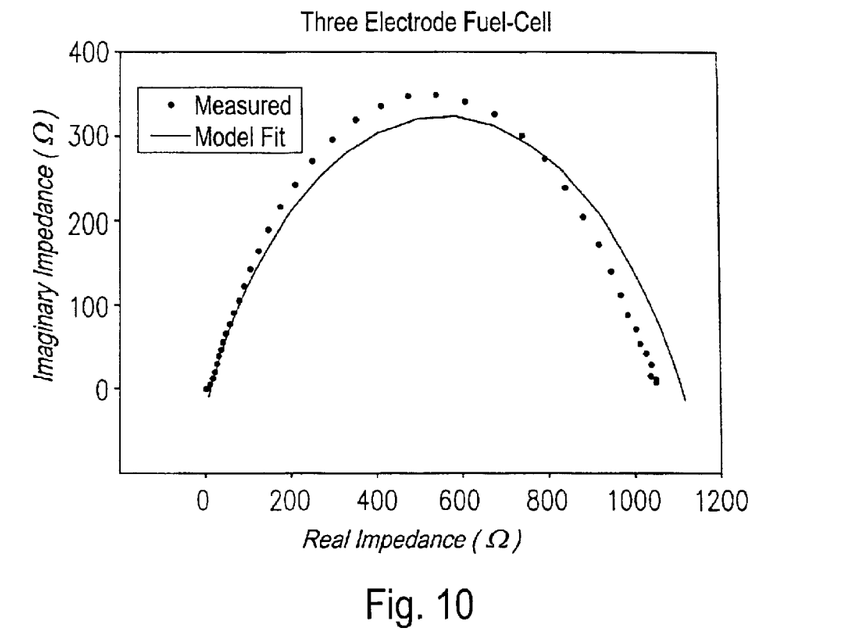
FIG. 10 is a comparison between the measured complex impedance and modeled fit of the three-electrode PEMFC at a polarization potential of 1.00V vs. Pt-membrane interposed reference electrode.
Figure 11:
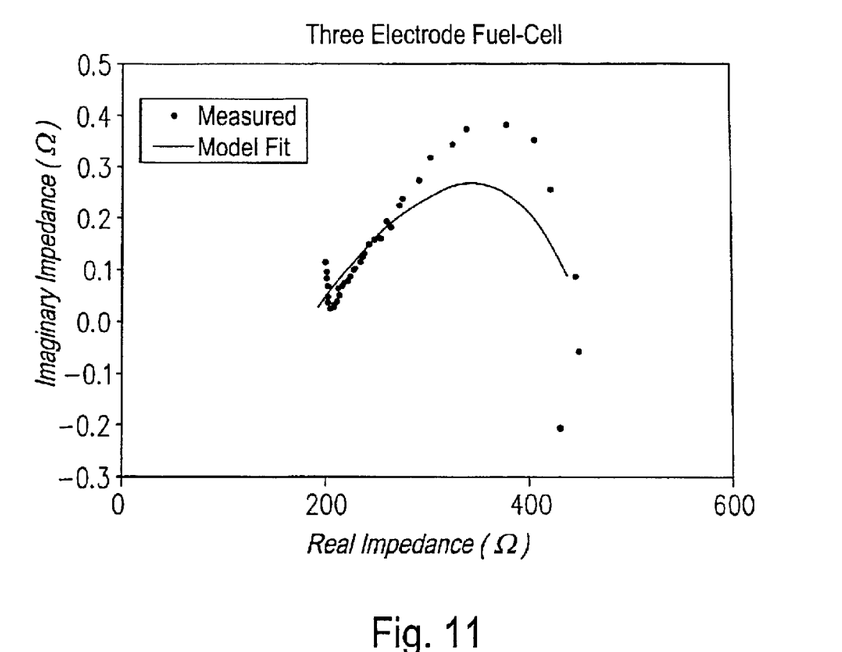
FIG. 11 is a comparison between the measured complex impedance and modeled fit of the three-electrode PEMFC at a polarization potential of −0.628V vs. Pt-membrane interposed reference electrode.
Figure 12:
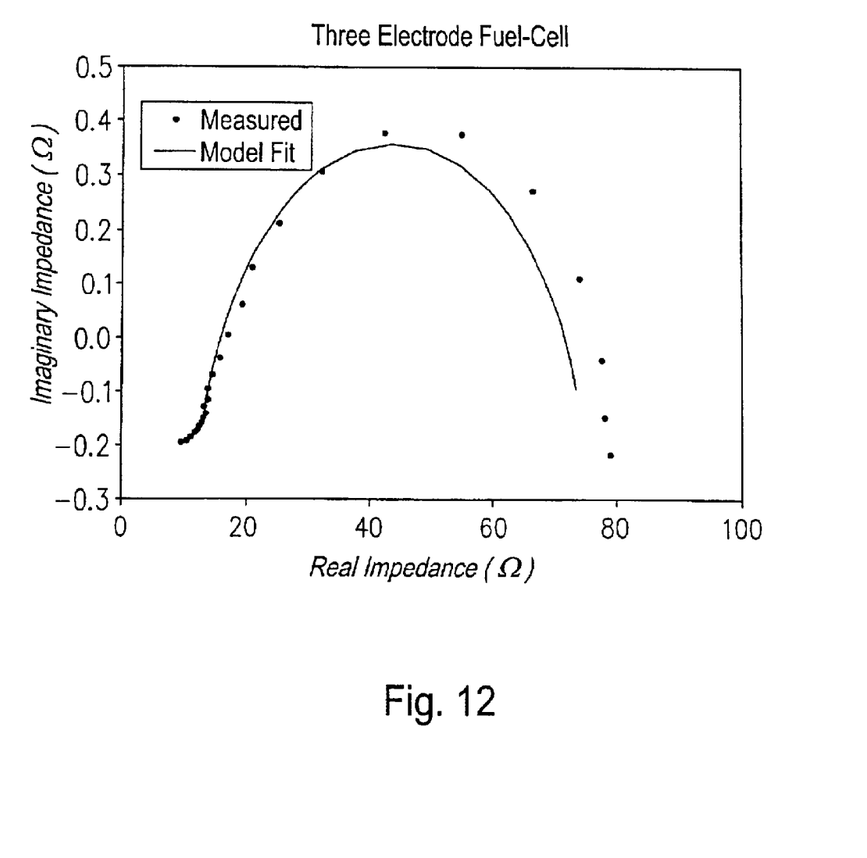
FIG. 12 is a comparison between the measured complex impedance and modeled fit of the three-electrode PEMFC at a polarization potential of 0.628V vs. Pt-membrane interposed reference electrode.

The apparatus of the EIS methodology is depicted in FIGS. 7A and 7B. FIG. 7A shows a Zahner, Model IM6e, integrated potentiostat/frequency response analyzer (FRA) 500 controlled by an independent computer (not shown). A 10 mV sinusoidal voltage signal generated by the FRA 500 was superimposed onto a dc polarization potential, which was applied at the working electrode of a fuel cell 100 (shown in FIG. 7B) by the integrated potentiostat, and the current response across the cell was measured through the potentiostat to determine the impedance response as a function of frequency. A frequency range of 100 kHz to 0.1 Hz was used in most of the measurements.

In FIG. 7B, a cathode 106 is shown as the working electrode and an anode 101 is shown as the counter electrode. However, it should be appreciated that in other cases the anode 101 may be the working electrode, with the cathode 106 as the counter electrode. A third electrode 104 and a solid electrolyte membrane 1046 are interposed between the anode 101 and the cathode 106. When the third electrode 104 includes a metalized surface on a membrane, the metalized surface should face away from the outer electrode (the anode 101 in FIG. 7B), and toward another membrane 1046, which may be, for example, a solid electrolyte membrane. The third electrode 104, including the metalized surface, should be gas-permeable.

Additionally, in FIG. 7B, a resistive load is shown connected between an air passage 108 and an $H_2$ passage 109. This assumes that the air passage 108 and the $H_2$ passage 109 are electrically conductive and are in electrical contact with the cathode 106 and the anode 101, respectively. However, it should be appreciated that the resistive load may be connected directly between the anode 101 and the cathode 106, and that the passages 108 and 109 need not be electrically conductive. Similarly, although the working electrode lead and the counter electrode lead are shown directly connected to the cathode 106 and the anode 101, respectively, it should be appreciated that they may be connected via passages 108 and 109, respectively, when the passages 108 and 109 are electrically conductive.

Electrochemical impedance measurements in all cases were done as the fuel cell 100 operated under a resistive load (as shown in FIG. 7B). The electrochemical response of the fuel cell 100 under this arrangement was determined as a function of the dc polarization potential, which was applied at the working electrode relative to the interposed membrane electrode 104 (reference electrode). The dc polarization, therefore, was varied such that the thermodynamic conditions imposed at the working electrode ranged from favorable to unfavorable relative to the electrochemical function of the half-cell reaction. The polarization conditions and the consequent thermodynamic effect that is imposed on the half-cell reaction was summarized in Table 1.

Results

The experimental results of EIS measurements performed on the three-electrode MEA fuel cell are shown graphically in FIGS. 8–12. Here, the vector representations of the electrochemical impedance are mapped onto the complex impedance plane (Nyquist plot) for each of the polarization potentials listed in Table 1. In each case, the measured values of the complex impedance are compared with the results of the model fit (solid curve).

It is observed from the series of measurements depicted in FIGS. 8–12 that the complex electrochemical impedance of the MEA fuel cell behaved as predicted by the parametric model of FIG. 6 (Equations 14, 17, and 18). This behavior is characterized by the Nyquist plots as an inflection in the complex impedance toward the high-frequency region of the spectrum, associated with the distributed pore resistance, and a non-ideal impedance arc toward low frequencies, which is associated with the diffusion limited mass-transport and charge-transfer resistance of the cell. The fitted parameters derived from these measurements are compared in Table 2 as a function of the applied polarization potential.

A salient feature of these results is the control that one can impart over the electrochemical function of the cell by manipulating the thermodynamic state of the half-cell reaction using the interposed electrode. Specifically, as the thermodynamic state of the cathode is made only slightly less favorable toward the reduction of oxygen, the charge transfer resistance ($R_{ct}$) is observed to increase dramatically with a corresponding decrease in the charging capacitance. In essence, the electrochemical function of the fuel cell is switched off by altering the polarization of the half-cell reaction relative to the interposed third electrode. Upon the imposition of a favorable thermodynamic state at the cathode (−0.628 V vs. interposed Pt membrane electrode), a significant gain in cathodic current is produced due to favorable reduction in the charge transfer resistance at the interface. Furthermore, the pore electrolyte resistance, as developed theoretically in this invention, decreases significantly under cathodic polarization (conducive to oxygen reduction), and is dominated by the charge transfer resistance under anodic polarization (counteractive to oxygen reduction).

The inherent sensitivity of the three-electrode MEA fuel cell toward control and response of the half-cell thermodynamic state has a number of practical implications in regard to the evolution of fuel cell designs. The utility of the invention are addressed briefly as follows.

First, integrated control over fuel cell power production by electronic means offers an opportunity to continuously optimize the power output of the fuel cell in proportion to the load without having to alter the flow of feed gases, or physically disconnecting the load in instances where zero output is desired. This mode of operation would be analogous to the electronic engine management systems used today in automobiles to continuously adjust the operational characteristics of an internal combustion engine depending on load demands and environmental conditions.

Second, the complete recovery of the cell dynamics (i.e., kinetic and thermodynamic effects) through a polarization transition imposed on the cathode (Table 1) indicates that continuous, cyclic polarization imposed on the cell, in the manner of three-electrode configuration, can be transitioned to the development of alternating-current fuel-cells. This technology would have particular relevance to microelectromechanical systems (MEMS)-based fuels cells, wherein the frequency of oscillation is limited only by the feature scale of the effective electrochemical diffusion layer (i.e., the shorter the diffusion path, the lower is the loss factor and, in turn, the higher is the limit of oscillation frequency). The ability to alternate the polarization of the fuel cell also would allow the use of mixed gasses ($H_2$ and Air), since the half-cells would alternate between cathodic and anodic electrochemical function.

Third, the ability to manipulate the thermodynamic state of the half-cell reaction can be used advantageously to reactivate the catalyst subsequent to constituent poisoning (e.g., carbon monoxide and sulfur contamination) through cyclic polarization of the system. Intelligent manipulation of the shape and frequency of this low-amplitude cyclic polarization can be used to dissociate unwanted constituents bound to the catalyst surface.

Finally, an immediately useful application of three-electrode designs of MEA fuel cells is realized by considering the present need to monitor the health of fuel cell systems in situ. In this regard, we consider one of the most important operational challenges facing MEA fuel cells today, which is controlling the state of hydration of the ionomer membrane. The hydration state of the membrane is arguably one of the most sensitive parameters that directly impacts the continuous performance and power densities achievable in modern MEA designs. An integrated feedback system that is capable of sensing the hydration state of the membrane, among other material factors, and, in turn, control the humidification subsystem is a logical application of the three-electrode MEA. Because the three-electrode MEA configuration in combination with appropriate measurement apparatuses has been shown to make possible the extraction of very detailed physicochemical information, it is possible to extend the laboratory techniques demonstrated in the present invention to an enabling sensor technology for monitoring the health of fuel cells.

One Example of the Embodiment

Figure 1:
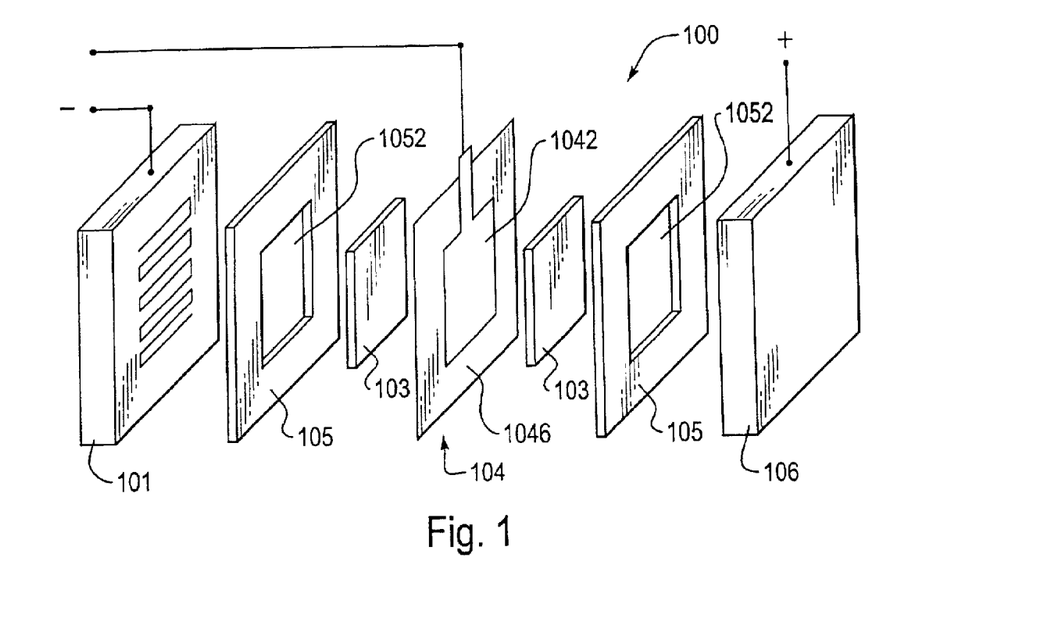
FIG. 1 is a schematic representation of a three-electrode fuel cell as used in one example of the embodiment. An example is shown for a three-electrode PEMFC.

One example of the embodiment of the present invention relates to the hydrogen/oxygen electrical couple used as in the conventional architecture of a polymer electrolyte membrane fuel cell (PEMFC). A schematic representation of a three-electrode fuel cell, which in this example is a three-electrode PEMFC 100, is depicted in FIG. 1. A third electrode 104, which may be a reference electrode, and which is hereafter called a membrane electrode, is interposed between an anode 101 and a cathode 106. The anode 101 and the cathode 106 may include, for example, graphite blocks.

The membrane electrode 104 is sandwiched in between the conventional components of a PEMFC stack arrangement, as shown in FIG. 1, such that a metalized face of the membrane electrode 104 is in contact with a catalyzed membrane 1046, which may be a polymer electrolyte membrane such as is ordinarily used in such PEMFC arrangements. The net result of this configuration is a double thickness membrane with a center layer of metal, thus constituting an interposed membrane electrode 104.

Gas diffusion backings 103 are positioned on either side of the membrane electrode 104. Teflon masks 105, each with an opening 1052 corresponding to the gas diffusion backings 103, are interposed respectively between the membrane electrode 104 and the anode 101 and between the membrane electrode 104 and the cathode 106. Electrical contact to the membrane electrode 104 is made by any means possible as long as the physical seal between the anode and cathode of the stack components is not compromised. For example, in the present example the membrane electrode 104 is allowed to extend beyond the sealing surfaces of the stack components to make an electrical connection.

Figure 2A:
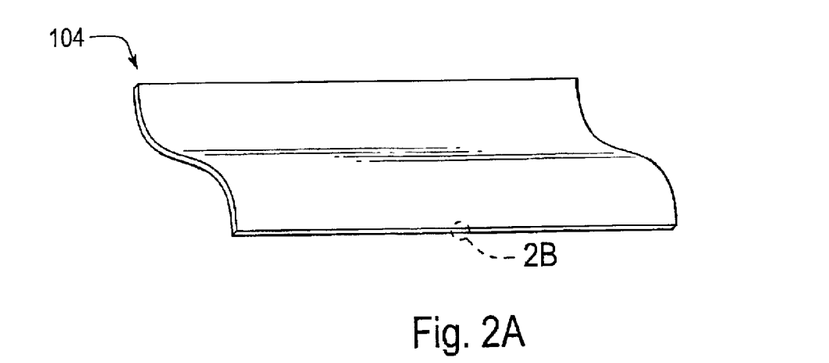
FIG. 2A is a perspective view of the third electrode as used in one example of the embodiment.
Figure 2B:
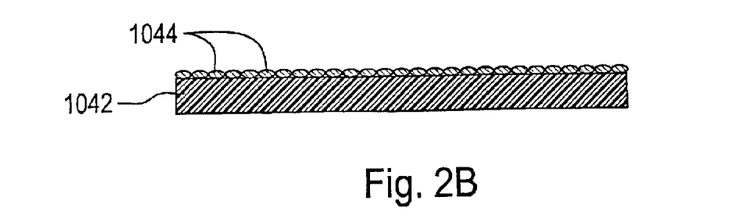
FIG. 2B is an enlarged cross-sectional view of a portion of the third electrode of FIG. 2A.

FIG. 2A shows a perspective view of the membrane electrode 104, which may be flexible. FIG. 2B shows an enlarged cross-section of a portion of the membrane electrode 104 of FIG. 2A. As shown in FIGS. 2A and 2B, the membrane electrode 104 in the present example includes a polymer membrane 1042. A thin film of an electrically conductive metal, such as metal particles 1044, is deposited on one face of the polymer membrane 1042.

In this as in any other example of an embodiment for a three-electrode fuel cell, the reaction kinetics, thermodynamics, and transport mechanisms relevant to the half-cell reduction at the cathode and half-cell oxidation at the anode can be controlled selectively by the advent of a third electrode. Potentiostatic control of the anode or cathode using an interposed third electrode will be shown to have profound effects on the charge transfer and transport kinetics of the electrochemical oxidation and reduction. In a broad sense, the three-electrode fuel cell of the present invention provides an ideal platform on which those electrochemical processes can be studied for the purpose of experimental evaluation and system development. Moreover, it provides a means by which those processes can be controlled in situ as a novel design feature useful in the art of fuel-cell power generation.

While the systems and methods according to this invention have been described in conjunction with the specific embodiments described above, many equivalent alternatives, modifications and variations will become apparent to those skilled in the art once given this disclosure. Accordingly, the preferred embodiments of the invention as set forth above are considered to be illustrative and not limiting. Various changes to the described embodiments may be made without departing from the spirit and scope of the invention.

TABLE 1

Experimental parameters used to measure the electrochemical impedance response of a three-electrode MEA fuel cell

| Applied E vs. Interposed Pt Membrane (V) | AC Perturbation Amplitude (mV) | Resistive Load (Ω) | Thermodynamic Effect |
|---|---|---|---|
| Open Circuit <0.448> | 10 | 5 | Cathodic polarization, pseudo-equilibrium condition of cell under load |
| 0.708 | 10 | 5 | Anodic polarization counteractive to oxygen reduction at cathode |
| 1.000 | 10 | 5 | Anodic polarization, very counteractive to oxygen reduction at cathode |
| −0.628 | 10 | 5 | Cathodic polarization, conducive to oxygen reduction at cathode |
| 0.628 | 10 | 5 | Anodic polarization, slightly counteractive to oxygen reduction at cathode |

TABLE 2

Results of model parameter fits as a function of the applied polarization potential (thermodynamic state) at the cathode.

| Applied E vs. Interposed Pt Membrane (V) | Measured Current (μA) | Pore Electrolyte Resistance, $Z_{pore}$ (Ω) | Charge Transfer Resistance, $R_{ct}$ (Ω) | Cell Resistance (Ω) | Cell Capacitance (mF) | Distribution Exponent, β |
|---|---|---|---|---|---|---|
| OCP <0.448> | −102 | 11.9 ± 17.4% | 88.1 ± 12.3% | 33.6 ± 0.85% | 1.78 ± 5.21% | 0.934 ± 0.31% |
| 0.708 | 213 | 1.96 ± 19.1% | 110 ± 13.3% | 10.5 ± 0.54% | 0.233 ± 3.48% | 0.784 ± 0.22% |
| 1.000 | 860 | →0† | 1094 ± 4.36% | 25.4 ± 13.2% | 0.00117 ± 7.37% | 0.684 ± 0.26% |
| −0.628 | −50,026 | 1.66 | 0.827 | 7.93 | 7.65 | 0.622 |

TABLE 2-continued

Results of model parameter fits as a function of the applied polarization potential (thermodynamic state) at the cathode.

| Applied E vs. Interposed Pt Membrane (V) | Measured Current ($\mu$A) | Pore Electrolyte Resistance, $Z_{pore}$ ($\Omega$) | Charge Transfer Resistance, $R_{ct}$ ($\Omega$) | Cell Resistance ($\Omega$) | Cell Capacitance (mF) | Distribution Exponent, $\beta$ |
|---|---|---|---|---|---|---|
| 0.628 | −1.14 | 8.70 ± 14.8% | 61.9 ± 13.2% | 10.2 ± 15.8% | 1.29 ± 5.83% | 0.937 ± 0.43% |

†Dominated by charge transfer resistance ($R_{ct}$)

What is claimed is:

1. A fuel cell comprising;
   an anode electrode;
   a cathode electrode; and
   a third electrode interposed between the anode and the cathode electrodes, the third electrode inducing polarization between the anode electrode and the third electrode or between the cathode electrode and the third electrode, so as to lower activation energy of a cathode half-reaction or an anode half-reaction.

2. The fuel cell according to claim 1, wherein the third electrode is a reference electrode.

3. The fuel cell according to claim 1, wherein the third electrode and at least one of the anode and cathode electrodes are coupled to an electrical apparatus.

4. The fuel cell according to claim 3, wherein the electrical apparatus is a voltage or current source.

5. The fuel cell according to claim 3, wherein the electrical apparatus is an electrical measurement device.

6. The fuel cell according to claim 1, wherein the third electrode is used to control processes of at least one of the following: the anode and the cathode electrodes.

7. The fuel cell according to claim 6, wherein the processes include at least one of the following: thermodynamic, chemical, kinetic, and transport phenomena.

8. The fuel cell according to claim 1, wherein the third electrode is used to monitor the health of any component of the fuel cell.

9. The fuel cell according to claim 8, wherein a component of the third electrode conducts electrons.

10. The fuel cell according to claim 1, wherein the third electrode includes a material that permits ions of the electrochemical couple to be transported past, or conducted through, its interposition.

11. The fuel cell according to claim 1, wherein the third electrode includes at least one of the following: a polymer and a polymer composite.

12. The fuel cell according to claim 11, wherein the third electrode includes an electrically conductive component.

13. The fuel cell according to claim 1, wherein the third electrode includes at least one of the following: a metallic and a polymer grid, or a conducting polymer.

14. The fuel cell according to claim 1, wherein the third electrode includes a material that, when coupled with the anode or cathode electrodes of the fuel cell, produces an electromotive force (e.m.f) without the advent of an external voltage source.

15. The fuel cell according to claim 1, further including at least one of the following fuel couple: substantially pure hydrocarbons, methanol, hydrazine, reformed ammonia, natural gas, and molten carbonate.

16. The fuel cell according to claim 1, further including an electrolyte.

17. The fuel cell according to claim 16, wherein the electrolyte is a polymer solid electrolyte.

18. The fuel cell according to claim 16, wherein the electrolyte includes at least one of the following: a solid oxide, phosphoric acid, and alkaline.

19. A method of manufacturing a fuel cell, comprising:
    forming an anode electrode;
    forming a cathode electrode;
    forming an electrolyte material;
    depositing a thin film of an electrically conductive metal or conducting polymer to a reference electrode; and
    sandwiching the reference electrode and electrolyte material between the anode and cathode electrodes.

20. The method according to claim 19, wherein the reference electrode includes a membrane.

21. The method according to claim 20, wherein the membrane is a polymer membrane.

22. A method for operating a fuel cell, comprising:
    applying an interactive feedback system to control the state of hydration of the ionomer membrane utilizing a third electrode other than an anode or cathode electrode, the third electrode being insulated from direct electrical contact from either the anode or the cathode by virtue of being embedded within an electrolyte.

23. The method according to claim 22, wherein the interactive feedback system regulates the fuel cell.

24. The method according to claim 22, wherein the interactive feedback system further monitors electrochemical processes at the anode or cathode.

25. The method according to claim 22, wherein the third electrode includes a material that permits ions of the electrochemical couple to be transported past, or conducted through, its interposition.

* * * * *

UNITED STATES PATENT AND TRADEMARK OFFICE
CERTIFICATE OF CORRECTION

PATENT NO. : 6,756,141 B2  
DATED : June 29, 2004  
INVENTOR(S) : Michael A. Miller and Craig M. Wall It is certified that error appears in the above-identified patent and that said Letters Patent is hereby corrected as shown below:

Column 6,  
Line 65, should read -- the complex impedance, which depends on the radial frequency $\omega$, is expressed generically as --.

Signed and Sealed this

Twenty-third Day of November, 2004

JON W. DUDAS  
*Director of the United States Patent and Trademark Office*